July 22, 1930.  A. BOHM  1,771,026
DENTAL FLOSS SAW
Filed July 29, 1929
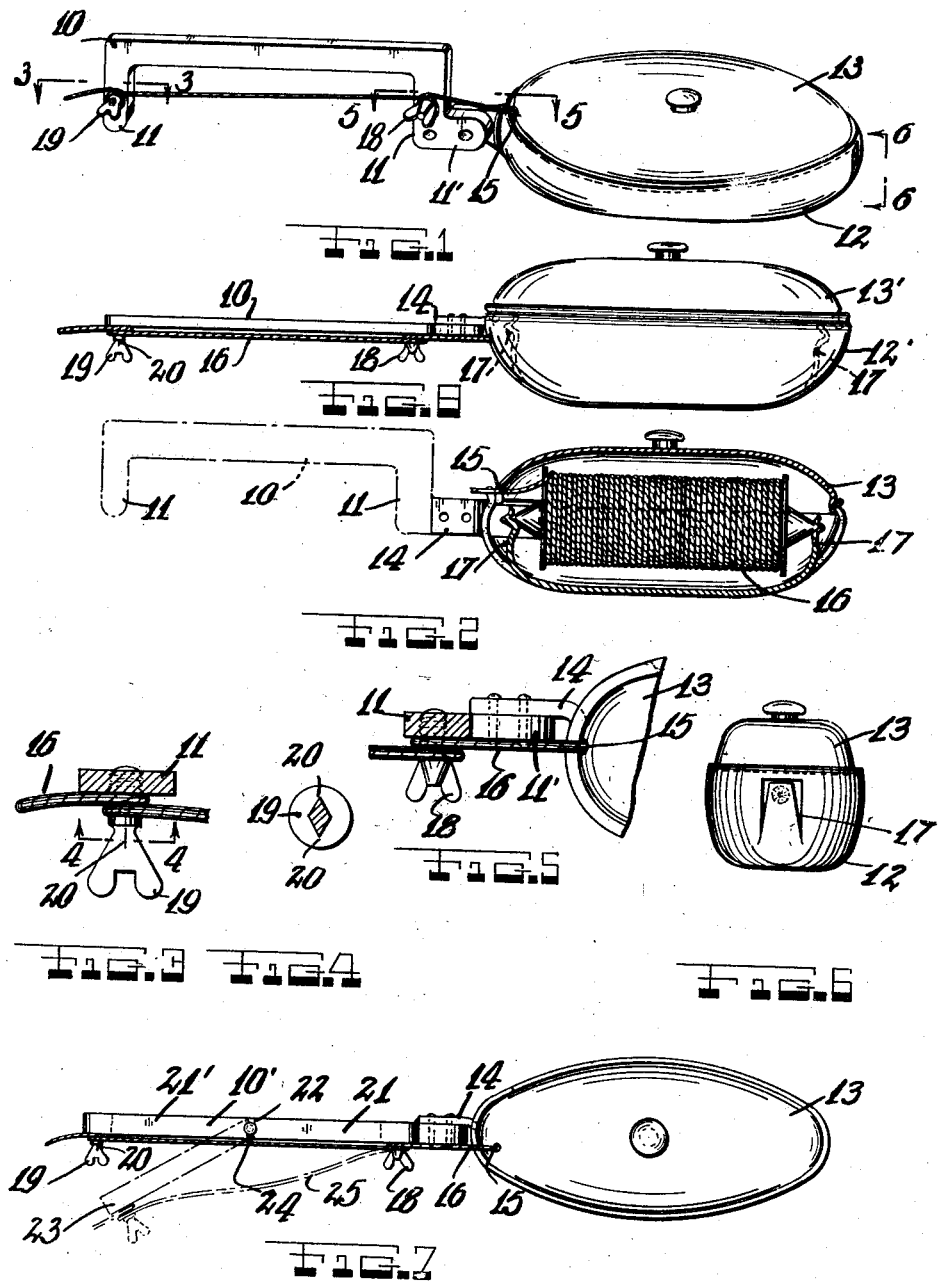
INVENTOR
Alfred Bohm
BY
ATTORNEY Patented July 22, 1930

1,771,026

UNITED STATES PATENT OFFICE

ALFRED BOHM, OF BROOKLYN, NEW YORK

DENTAL FLOSS SAW

Application filed July 29, 1929. Serial No. 381,843.

This invention relates to new and useful improvements in dental floss saws.

The invention has for an object the provision of a device of the class mentioned which is of simple durable construction, dependable in use and efficient in action, and which can be manufactured and sold at a reasonable cost.

The invention proposes a dental floss saw having a longitudinal frame strip with transverse ends, one of the ends supporting a dental floss container for holding dental floss, and both ends being arranged for the attachment of dental floss in a tight condition and in a progression of sections, one section at a time and renewable by drawing out and cutting off the used section, the tight condition being obtained with specific improved means.

For further comprehension of the invention, and of the objects and advantages thereof, reference will be had to the following description and accompanying drawings, and to the appended claims in which the various novel features of the invention are more particularly set forth.

In the accompanying drawing forming a material part of this disclosure:—

Fig. 1 is a perspective view of a device constructed according to this invention.

Fig. 2 is a longitudinal transverse sectional view of Fig. 1.

Fig. 3 is an enlarged horizontal sectional view taken on the line 3—3 of Fig. 1.

Fig. 4 is a vertical sectional view, taken on the line 4—4 of Fig. 3.

Fig. 5 is an enlarged fragmentary sectional view, taken on the line 5—5 of Fig. 1.

Fig. 6 is an end view of Fig. 1, looking in the direction of the line 6—6.

Fig. 7 is a plan view of a device of modified form, and

Fig. 8 is a plan view of a device of further modified form.

The reference numeral 10 indicates generally the longitudinal central portion of a frame strip having transverse ends 11. This frame strip preferably should be made of composition material or non-rustable metal.

A dental floss holder is attached on one of the transverse ends 11 which is provided with a lug 11' for this purpose, and consists of a cup portion 12 opened at its top which is normally closed by a cover 13 arranged for frictionally maintaining its position, and a struck-out tongue 14 integral with the cup portion as clearly shown in Fig. 5 and attached upon the lug 11'. The cover 13 is formed with an aperture 15 providing for the passage of dental floss 16.

Tongues 17 are stamped inwards from the cup 12 and serve to rotatively support a spool of dental floss. The floss from this spool extends thru the aperture 15 and is indicated by reference numeral 16. A thumb screw 18 threadedly engages in the end 11 near the floss holder. The floss 16 may be wound around the screw 18 and clamped as clearly shown in Fig. 5. A second thumb screw 19 threadedly engages the other transverse end 11. The floss 16 may be extended between the transverse ends 11 and wound upon the screw 19 and then clamped as shown in Fig. 3.

A portion of the head of the thumb screw 19 is sharpened as indicated by reference numeral 20 constituting knife edges so that the dental floss may be cut after engagement upon the stud. While the thumb screw is shown provided with the knife edge, it should be borne in mind that a knife edge may be provided upon a different portion of the device for the same purpose.

In operation of the device, a section of dental floss is tightly arranged between the thumb screws of the transverse ends. Then the gaps between the teeth are cleaned by placing the dental saw in one's mouth and moving it back and forth. When a new section of dental floss is desired, the thumb screws are loosened and the floss drawn so that a new section emerges from the container. This new section is then tightly arranged between the thumb screws and the used section is cut off with the aid of the knife edges 20.

In the modified form of the device illustrated in Fig. 7, a dental floss saw has been shown which is provided with a frame strip having a longitudinal central portion 10' consisting of two hinged sections indicated by numerals 21 and 21', respectively. The hinged construction is so arranged as to provide a shoulder 22 limiting the pivotal movement of the sections in one direction only to a position in a straight line with the other sections.

Fig. 7 shows the sections in a straight line and the dot and dash lines 23 in this figure indicate a pivoted position of the sections. A spring 24 is coaxially mounted upon the hinge of the sections and arranged to normally urge the sections into the straight line position referred to.

The dental floss extending from the floss container should first be clamped by the thumb screw 18 and then the section 21' pivoted out of line with the section 21 and in this condition the floss should next be clamped beneath the thumb screw 19. The spring 22 will then tend to urge the sections into a straight line and thus provide tension for the dental floss between the thumb screws. Dot and dash lines 25 indicates the dental floss in stretched position between the thumb screws while the sections are out of line.

The modified form illustrated in Fig. 8 discloses the floss container consisting of a front cup portion 12' opened at the rear side which is normally closed with a rear cover 13' arranged for frictionally maintaining its position. In other respects this form is similar to the preferred form just described.

While I have shown and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent is:—

1. A dental floss saw, comprising a longitudinal frame strip with transverse ends, and formed of two sections pivotally connected, means for normally urging the sections into a straight line, a dental floss holder attached on one of said ends and formed with an aperture providing for the passage of dental floss from the holder, and means on the said ends for holding a section of dental floss in a stretched condition.

2. A dental floss saw, comprising a longitudinal frame strip with transverse ends, and formed of two sections pivotally connected, and formed with shoulders limiting pivotal movement of the sections in one direction; a spring for normally urging the sections into a straight line, a dental floss holder attached on one of said ends and formed with an aperture providing for the passage of dental floss from the holder, and means on the said ends for holding a section of dental floss in a stretched condition.

3. A dental floss saw, comprising a longitudinal frame strip with transverse ends, and formed of two sections pivotally connected, a spring for normally urging the sections into a straight line, a dental floss holder attached on one of said ends and formed with an aperture providing for the passage of dental floss from the holder, and means on the said ends for holding a section of dental floss in a stretched condition.

4. A dental floss saw, comprising a longitudinal frame strip with transverse ends, a dental floss holder attached on one of said ends and formed with an aperture providing for the passage of dental floss from the holder, and means on the said ends for holding a section of dental floss in a stretched condition, said floss holder being formed with struck-out tongues for holding a spool of dental floss.

In testimony whereof I have affixed my signature.

ALFRED BOHM.